United States Patent [19]
Thompson

[11] Patent Number: 5,415,452
[45] Date of Patent: May 16, 1995

[54] HEEL SAVER

[76] Inventor: Deborah Thompson, 2061 9th La. NE., Winter Haven, Fla. 33881

[21] Appl. No.: 209,472

[22] Filed: Mar. 14, 1994

[51] Int. Cl.⁶ .............................. B60N 3/04; B60N 3/06
[52] U.S. Cl. .................................. 296/97.23; 296/75; 180/90.6
[58] Field of Search .............................. 296/97.23, 75; 180/90.6

[56] References Cited

U.S. PATENT DOCUMENTS

| | | | |
|---|---|---|---|
| 2,057,873 | 10/1936 | Atwood | 296/97.23 X |
| 2,158,017 | 5/1939 | Vrooman | 180/90.6 X |
| 2,297,000 | 9/1942 | Kult | 180/90.6 X |
| 2,522,186 | 9/1950 | McHenry | 296/75 X |
| 3,823,058 | 7/1974 | Yamaguchi | 180/90.6 X |
| 4,910,061 | 3/1990 | St. Julian | 296/97.23 X |

FOREIGN PATENT DOCUMENTS 4104123  8/1992  Germany ........................... 296/97.23

OTHER PUBLICATIONS

Western Auto, 1951–1952 Catalog, p. 62.

*Primary Examiner*—Dennis H. Pedder

[57] ABSTRACT

A heel saving device has a first straight part underlying an accelerator pedal of a vehicle and a second bulbous or circular part that is integral to the first part and which extends out from under the pedal towards the driver. The heel of the driver's shoe rests atop the bulbous second part when the vehicle is being operated, and protects the heel from abrasion by the floorboard. A chemical is added to the bulbous second part to prevent rubbing off of heel coloring, and a double-sided adhesive secures the device into position. In a second embodiment, a first straight part overlies a second straight part and a bulbous first part overlies a bulbous second part that has an adhesive-saving central opening formed in it.

5 Claims, 1 Drawing Sheet

HEEL SAVER

BACKGROUND OF THE INVENTION

1. Field of the invention

This invention relates, generally, to devices for protecting the heel of a shoe. More particularly, it relates to a device that protects a shoe heel of a driver of a vehicle.

2. Description of the prior art

Many people have noticed that shoe heels often wear out long before the rest of the shoe. The standard response to this problem has been to reinforce the heel by mounting a metal plate thereto. Such plates generate loud noises when the user thereof walks over a hard surface, however, and are also known to cause slippage on certain surfaces as well.

It has now been discovered that walking, for many people, is no longer the primary source of deterioration of the shoe heel. Instead, vehicle driving has become the primary source of wear and tear on heels. A long trip can severely damage the heel of the driver's right shoe. An accumulation of short trips has the same effect. What is needed, then, is a means for protecting the heel of a driver's shoe. At the time the present invention was made, however, it was not obvious to those of ordinary skill in the shoe art that there was even a need for a means for protecting the heel of a driver's shoe. Moreover, it would not have been obvious as to how the need could be fulfilled even if the need had been recognized.

SUMMARY OF THE INVENTION

The present invention provides the world's first device for protecting the heel of a vehicle driver's right shoe. The device is secured to the floorboard of a vehicle so that a first part of it extends under the accelerator pedal of the vehicle, and a second part of it extends out from under the pedal in the direction of the driver. The second part underlies the driver's right shoe heel when the vehicle is being operated, and performs the function of preventing the floorboard of the vehicle from abrading or otherwise wearing out said heel. It is also treated with special ingredients to prevent the coloring of the shoe heel from rubbing off.

The two parts of the device are formed integrally with one another. The first part is of straight configuration and has a uniform width along its extent. The second part has a bulbous or circular configuration. The device is formed of a flat, flexible piece of material such as cloth, and is secured into position by suitable double-sided adhesive means.

Accordingly, the bulbous part of the device supports the driver's heel when the vehicle is being operated. The large size of the bulbous part accommodates drivers of many differing styles of foot placement on the accelerator, i.e., regardless of the driver's style, the bulbous part of the device will support the heel and protect it from wear and tear. The breadth of the bulbous part also allows the driver to shift foot position during a drive over a wide range of positions.

It is therefore understood that the primary object of this invention is to provide a heel saver that protects heels from abrasion and from rubbing off of shoe color.

A closely related object is to provide a heel saving device that is easy to manufacture and thus affordable by consumers.

These and other important objects, advantages, and features of the invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
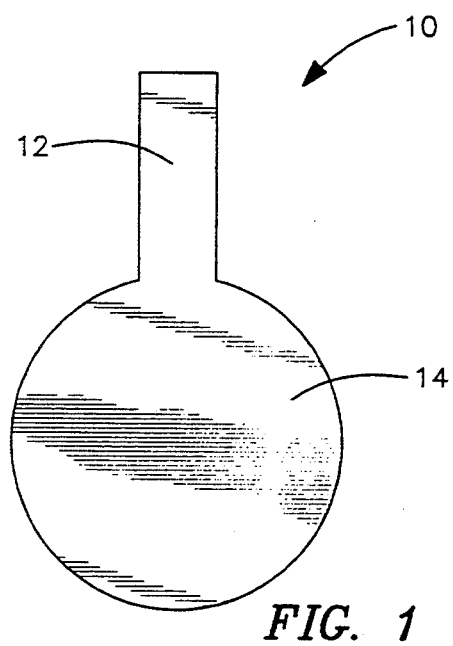
FIG. 1 is a top plan view of a first embodiment of the device.

Referring now to FIG. 1, it will there be seen that an illustrative embodiment of the invention is denoted as a whole by the reference numeral 10.

Figure 2:
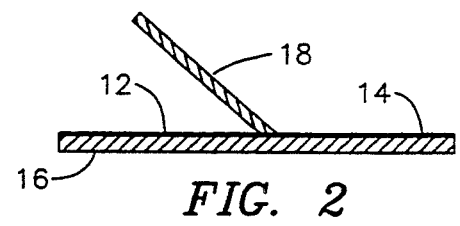
FIG. 2 is a side elevational view of said first embodiment.

Heel Saver (trademark) 10 includes a first part 12 of straight configuration and a second part 14 of bulbous or circular configuration. Straight part 12 is approximately the same length and width as the accelerator pedal of a typical vehicle, and the breadth or diameter of second part 14 is about twice the transverse extent of straight part 12. When the Heel Saver is operatively deployed, as depicted in FIG. 2, straight part 12 is positioned in overlying relation to the floorboard 16 of the vehicle, beneath the accelerator pedal 18. Bulbous part 14 also overlies the floorboard, but extends out from under the accelerator pedal, towards the driver. Thus, the heel of a driver's shoe will overlie bulbous part 14 regardless of whether the driver positions his or her shoe in exact alignment with the pedal 18 or in offset relation thereto, i.e., to the left or the right.

Figure 3:
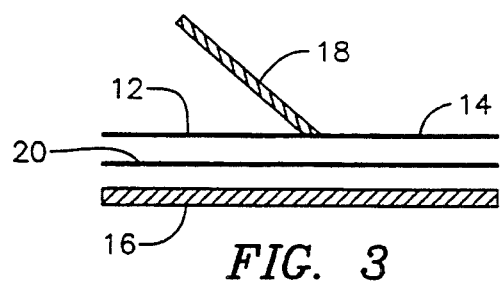
FIG. 3 is an exploded view of the device.

Both parts 12 and 14 are made of a flexible sheet material such as abrasion-resistant cloth and are integrally formed with one another as aforesaid. A double-sided adhesive strip 20 is secured to the underside of the Heel Saver as depicted in the exploded view of FIG. 3; the top side of adhesive strip 20 adheres to the underside of the Heel Saver, whereas the bottom side of said adhesive strip adheres to floorboard 16.

Figure 4:
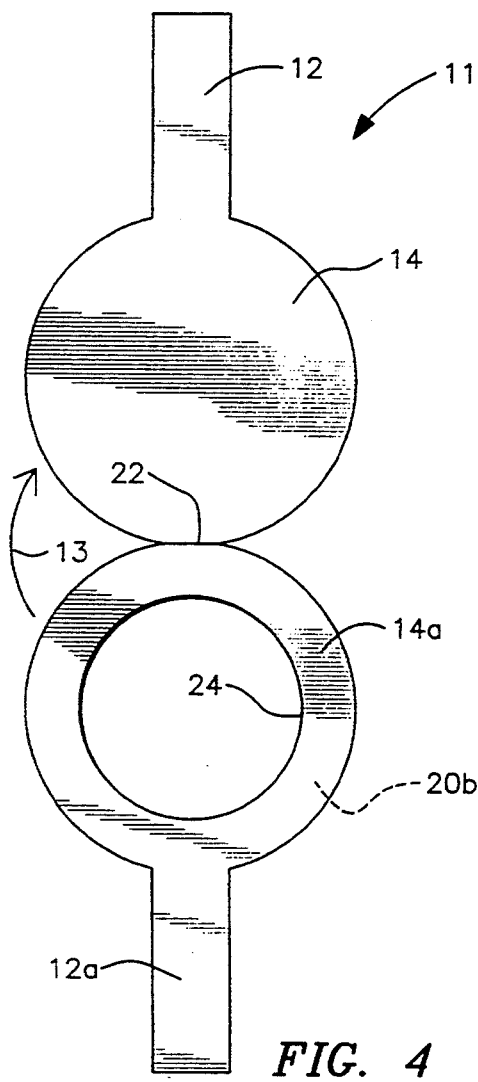
FIG. 4 is a top plan view of a second embodiment in its unfolded configuration.
Figure 5:
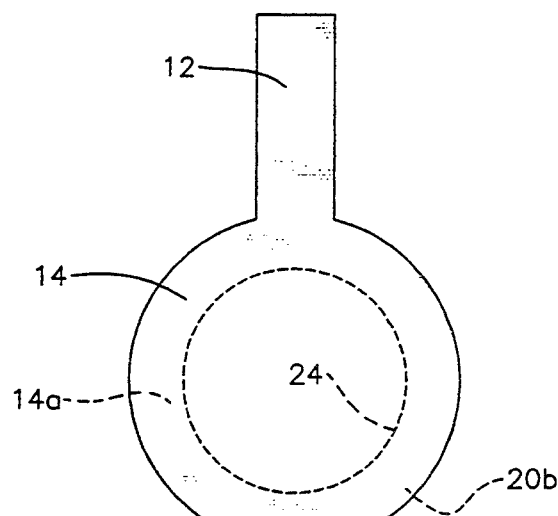
FIG. 5 is a top plan view of the second embodiment in its folded, operable configuration.
Figure 6:
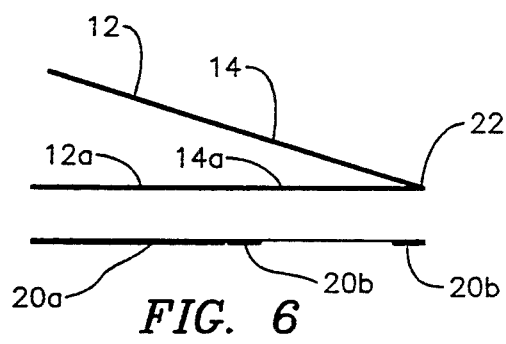
FIG. 6 is an exploded side elevational view of the second embodiment in its folded configuration.

In an alternative embodiment, shown in FIGS. 4–6, the Heel Saver is manufactured by folding an elongate sheet of material 11 at its transverse axis of symmetry 22; lower parts 12a and 14a underlie their respective counterparts 12, 14, respectively, when the lower part of the material is folded under and adhered to the upper part thereof as indicated by directional arrow 13 in FIG. 4.

A material saving central opening 24 is formed in the lower bulbous part 14a, and adhesive is saved by applying an annular ring thereof, denoted 20b in FIGS. 5 and 6, about the periphery of opening 24 as shown.

Significantly, the material from which the Heel Saver is made is treated with predetermined chemicals to prevent the color of the shoe heel from rubbing off. Thus, the device protects a heel from wearing out by protecting it from floorboard abrasion, and also prevents discoloration of the heel as well. In the first embodiment, chemicals may be saved by treating only bulbous part 14 since straight part 12 does not come into contact with the driver's shoe; in the second embodiment, only the first bulbous part need be treated since the second bulbous part disposed in underlying relation thereto does not contact the shoe.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for protecting the heel of a shoe from wear and tear when the shoe is worn by the driver of a vehicle of the type having an accelerator pedal, comprising:
    a sheet of material having a first straight part, a first bulbous part, a second bulbous part, and a second straight part;
    a folding line formed in said sheet of material at a transverse axis of symmetry thereof;
    said first and second straight parts being positioned substantially below an accelerator pedal in overlying relation to a floorboard of a vehicle, said first straight part overlying said second straight part when said material is folded along said folding line;
    means for adhering said first straight part to said second straight part:
    said first and second bulbous parts extending out from under said accelerator pedal, toward the driver of the vehicle, said first bulbous part overlying and being adhered to said second bulbous part when said material is folded along said folding line;
    means for securing said second straight part and said second bulbous part of said device in overlying relation to the floorboard of the vehicle; and
    a central opening of predetermined diameter formed in said second bulbous part.

2. The device of claim 1, wherein said means for securing includes a double-sided adhesive that underlies said second straight part and said second bulbous part, said double-sided adhesive being disposed on said second bulbous part on a perimeter thereof surrounding said central opening.

3. The device of claim 2, wherein said first and second straight parts have a common longitudinal extent and common transverse breadth substantially the same as the accelerator pedal.

4. The device of claim 3, wherein the common transverse breadth of said first and second bulbous parts is about twice the common breadth of the transverse breadth of the first and second straight parts.

5. The device of claim 3, wherein said first and second bulbous parts are generally circular in configuration and have a common diameter equal to about twice the transverse breadth of the first and second straight parts.

* * * * *